J. M. EDWARDS.
MEASURING AND WEIGHING DEVICE.
APPLICATION FILED MAY 9, 1919.
1,320,678.
Patented Nov. 4, 1919.
3 SHEETS—SHEET 2.
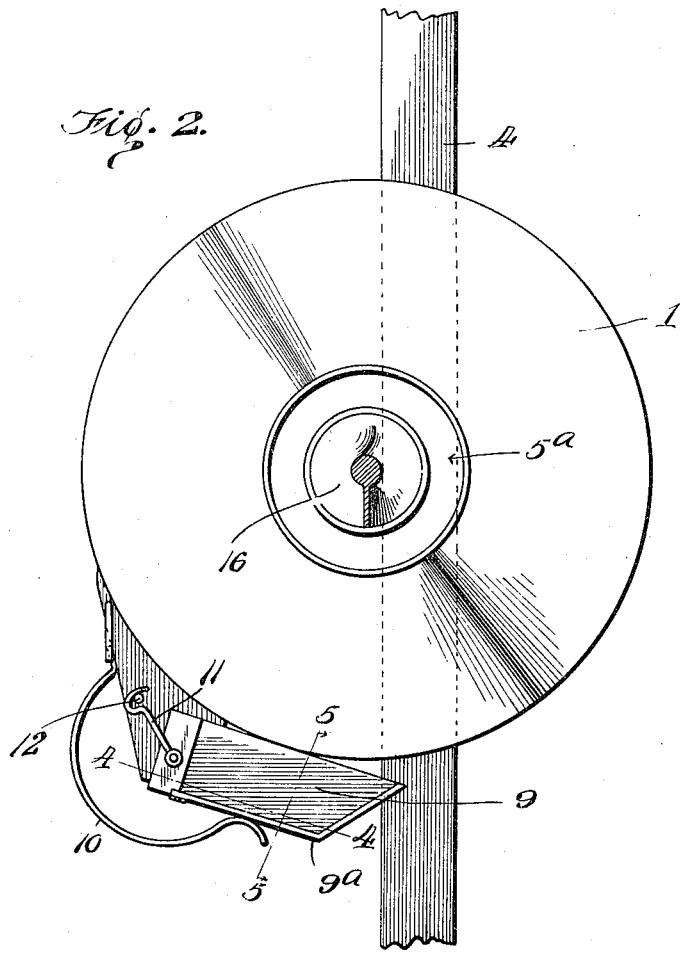
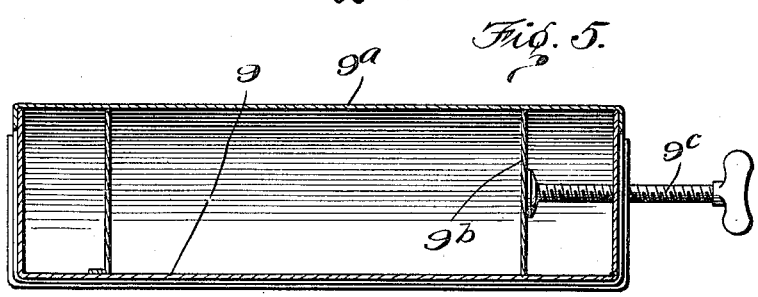
Inventor.
James M. Edwards
Geo. H. Bruce
Atty

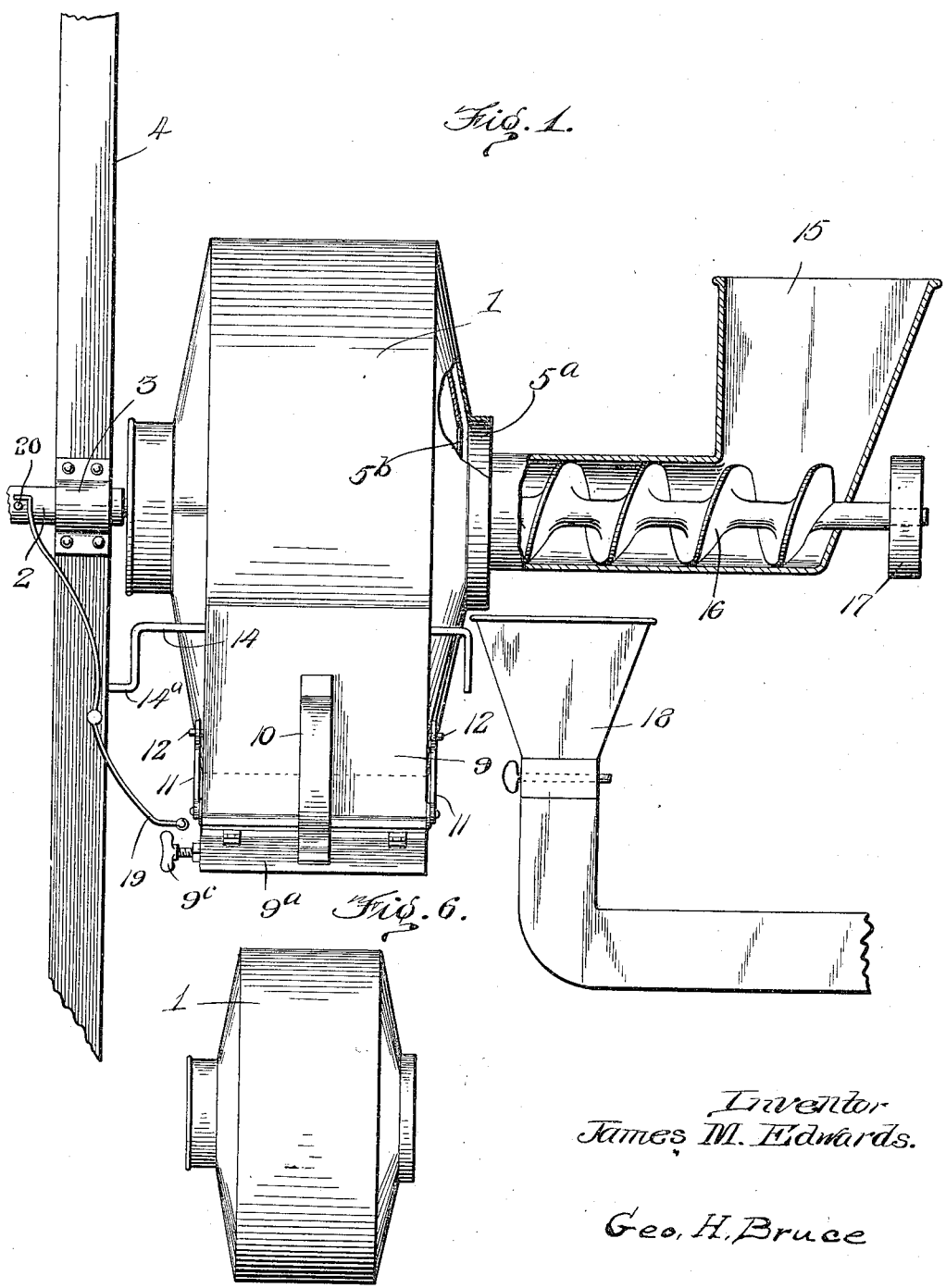

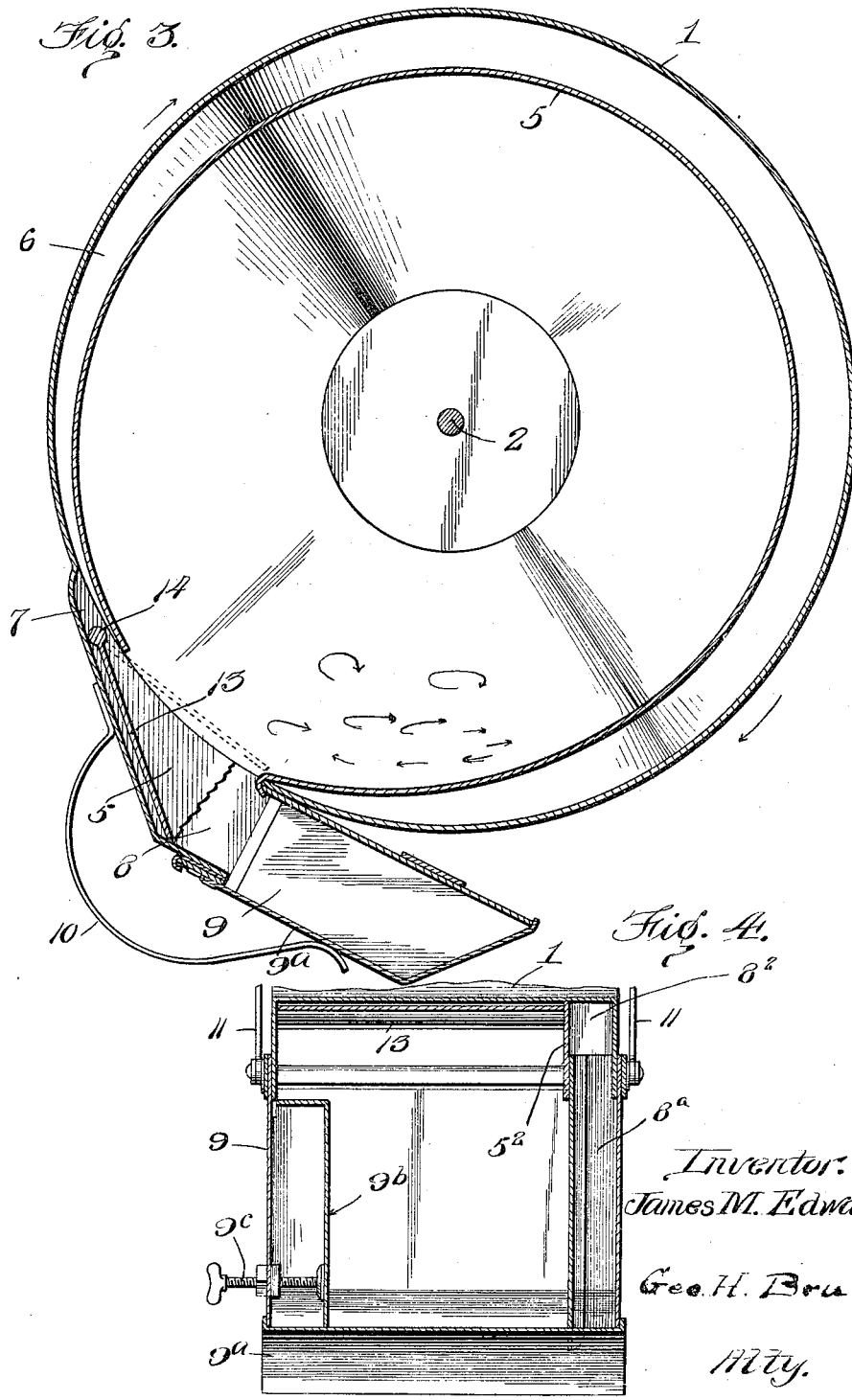

UNITED STATES PATENT OFFICE.

JAMES M. EDWARDS, OF RICHMOND HILL, NEW YORK.

MEASURING AND WEIGHING DEVICE.

1,320,678.  Specification of Letters Patent.   Patented Nov. 4, 1919.

Application filed May 9, 1919. Serial No. 295,927.

*To all whom it may concern:*

Be it known that I, JAMES M. EDWARDS, a citizen of the United States of America, residing at 4779 Kimball Ave., Richmond Hill, State of New York, have invented a new and useful Improvement in Measuring and Weighing Devices, of which the following is a specification.

This invention relates to improvements in measuring devices.

The invention has for its object more particularly the provision of means whereby the material or products for measurement may receive a preliminary turning, tumbling or agitation action also may be automatically delivered or fed into the measurer.

A further object is the provision of means to prevent or bar extraneous matter, as flying dust and the like, entering the device during the rotation thereof, also to control the proper feeding of the contents of the rotating receptacle to the measurer.

Other objects of the invention will be apparent in the subsequent disclosure thereof.

The invention consists of certain instrumentalities and features of construction substantially as hereinafter more fully disclosed and defined by the appended claims.

In the accompanying drawings is illustrated the preferred embodiment of my invention, wherein it will be understood that various changes and modifications as to the detailed construction and arrangement of parts may be made without departing from the scope of the claims, and in which drawings:

Figure 1 is a vertical longitudinal sectional elevation of my device;

Fig. 2 is a section thereof taken at right-angles to the plane of the aforesaid section;

Fig. 3 is an enlarged detailed view more especially of the rotating article or product-carrying receptacle and bucket or measurer showing the position of the cylinder contents and the relation thereof to the measurer or bucket;

Fig. 4 is section taken on the line 5—5 of Fig. 2;

Fig. 5 is a section taken on the line 4—4 of Fig. 2; and

Fig. 6 is a detached peripherical elevation of the rotating receptacle.

Referring in detail to the drawings, 1 designates a cylindrical container or receptacle suitably supported in position which contains the articles, products or commodities to which it may be desired to impart an agitating or stirring up action, obtainable by rotating said receptacle as presently made apparent. The receptacle, container or cylinder 1 is rotatably supported in position preferably by a shaft 2 journaled in bearings 3 secured upon a post 4 or otherwise upheld. Said shaft is adapted to provide for offsetting the receptacle from the support or post 4 to conveniently acccommodate associating therewith adjunctive parts presently noticed, and is suitably connected to a motor (not shown) for its actuation. The receptacle 1 is provided interiorly with a separate wall or member 5 spaced off from, and conforming to its circumferential portion and from one head thereof, with a preferably circular opening $5^a$ in coincidence with a corresponding opening $5^b$ of that head or end of the cylinder as clearly shown. This arrangement provides for forming a chamber 6 within the cylinder which may be termed an "air-release," the periphery of the cylinder being provided with an extension or segment 7 forming an initial outlet or discharge for the cylinder-contents. To the bottom wall of the segment 7 and the inner edge of the wall of the chamber 6 is suitably secured a strip 5 forming with the opposite wall or head of the cylinder a narrow or chute-like extension 8 of the chamber 6.

9 is a bucket or measurer preferably of the structural contour disclosed, having end-walls of general rectangular outline, a plane inner wall facing the periphery of the cylinder 1 and a hinged outer closure-forming wall $9^a$ for access to the bucket when desired. The closure or wall $9^a$ has its unhinged edge slanted inwardly and overlying the correspondingly inclined edges of the end walls of the bucket, said closure being automatically sprung into closed position by a suitable spring 10 with one end secured to the cylinder periphery and its free end bearing against said closure. The bucket or measurer 9, itself, has its relatively lower end adapted to be tightly fitted within or to the outer end of the segmental extension 7 of the cylinder 1 and provided with hooks or snaps 11 caught over the studs 12 projecting from the end walls of said extensions thus positioning the bucket for receiving the contents of the cylinder as in measuring out said contents. Buckets, or measurers of different capacities, of course, are provided according to the quantities of the cylinder contents it may be required to dispense.

The measuring capacity of the bucket may be varied when called for by the provision of a partition 9^b therein adapted to be controlled by an adjusting screw 9^c working in said partition and in an end-wall of the bucket and capable of convenient manipulation by the hand.

A wiper 13 is employed to suitably remove the surplus cylinder-contents, which may consist of a plate integral with a pivoting rod 14 hung in the end walls of the chamber 6, at the base thereof, said pivoting rod having outwardly extending laterally bent terminals 14^a one or both of which, by engagement with a suitably actuating member or members as for instance the post 4 or the like, provides for controlling the movement of said wiper at the requisite intervals in the rotation of the cylinder as in effecting the measuring operation.

It is particularly observed that the agitating cylinder 1 is driven to rotate in the direction of the arrow, or counter to the discharge of its contents so that while said contents are suitably tumbled or stirred up therein, said contents will, as they are brought opposite the discharge-opening of the cylinder, be caused to pass out through said opening into the bucket or measurer by gravity and accordingly without tendency to become congested and interfere with their free uninterrupted passage into the bucket or measurer. Also such passage of the contents from the cylinder into the bucket or measurer provides for properly retarding the flow thereof, according to their character as to density etc., and to impart thereto the requisite agitation for thoroughly freeing the same of any adhering accumulations, as is thought apparent.

Within a hopper 15, suitably provided for delivery of the commodities or articles to the cylinder 1, is suitably positioned the usual worm or screw feeding member 16 driven by a shaft 17 suitably belted to the motor for imparting motion to the cylinder, all of which are well known means employed for like purposes in the general art.

The cylinder 1 it will be seen has its heads convergent toward its periphery to provide for aiding, as is apparent, the agitation of the contents thereof as the cylinder is rotated.

In order to return any overflow of material from the agitating cylinder, a supplemental hopper 18 is suitably supplied thereto as shown, and means associated therewith to convey such overflow material to the feeding hopper, said means, although not shown, it will be readily understood may consist of piping leading from said supplemental hopper to the main hopper.

It is considered that the air taken up by the "air release" will be distributed throughout the cylinder and adjunctive parts thereof including the tubular or chute-like forming extension 8 leading into the bucket or measurer, and communicating with a chute-like forming compartment 8^a in the latter and thus provide for dissipating any dust accumulations or other extraneous particles and accordingly retain the contents of the agitating cylinder free therefrom.

A tapper or jarrer 19 is suitably positioned to act upon and jar the measurer to agitate its contents to aid the discharge of said contents, said tapper or jarrer being suitably suspended in position by a wire or flexible member suitably supported in position and adapted to be actuated by a stud 20 on the cylinder shaft.

Various changes as to minor details of the parts may be readily made and it will be understood fall within the purview of my invention.

I claim:

1. A device of the type described including a rotating carrying cylinder, means for rotating the same and a measuring implement carried by said cylinder and adapted to receive the contents of said cylinder, said cylinder being rotatable counter to the direction of the discharging of its contents into said measuring implement.

2. A device of the type described, including a rotating carrying cylinder provided with an interior separate chamber communicating therewith, said cylinder being provided with an exterior chute-like forming extension, in continuation of said interior chamber, and a measuring bucket also provided with a chute-like compartment in continuation of the aforesaid chute.

3. A device of the type described, including a rotating carrying cylinder, a measuring bucket fitted to and in communication therewith and a tappet adapted to jar said bucket as the cylinder is rotated.

In testimony whereof, I, JAMES M. EDWARDS have signed my name to this specification in the presence of two subscribing witnesses.

JAMES M. EDWARDS.

Witnesses:
FRANCIS NEIDER,
VICTOR GERBER.